United States

Scheffer

[11] 4,032,218

[5] June 28, 1977

[54] DEVICE FOR THE PRODUCTION AND MODULATION OF MONOCHROMATIC LIGHT

[75] Inventor: Terry J. Scheffer, Wettingen, Switzerland

[73] Assignee: BBC Brown Boveri & Company Limited, Baden, Switzerland

[22] Filed: May 27, 1975

[21] Appl. No.: 581,082

[30] Foreign Application Priority Data

June 7, 1974 Switzerland .................... 7792/74

[52] U.S. Cl. .................... 350/160 LC; 350/150
[51] Int. Cl.² .................... G02F 1/13
[58] Field of Search .................... 350/160 LC, 150

[56] References Cited

UNITED STATES PATENTS 3,836,230   9/1974   Adams et al. .................... 350/160 LC

OTHER PUBLICATIONS

Scheffer, "New Multicolor Liquid Crystal Displays . . . ", *J. App. Phys.*, Nov. 1973, pp. 4799–4803.

*Primary Examiner*—Edward S. Bauer
*Attorney, Agent, or Firm*—Oblon, Fisher, Spivak, McClelland & Maier

[57] ABSTRACT

An improved apparatus is disclosed for producing and modulating monochromatic light and is characterized by a bright, high contrast display surface. The apparatus includes a linear polarizer positioned between a light source and a liquid crystal cell, and utilizes, as a reflector, a substance with a helical structure. A circular polarizer is positioned between the liquid crystal cell and the reflector.

12 Claims, 2 Drawing Figures

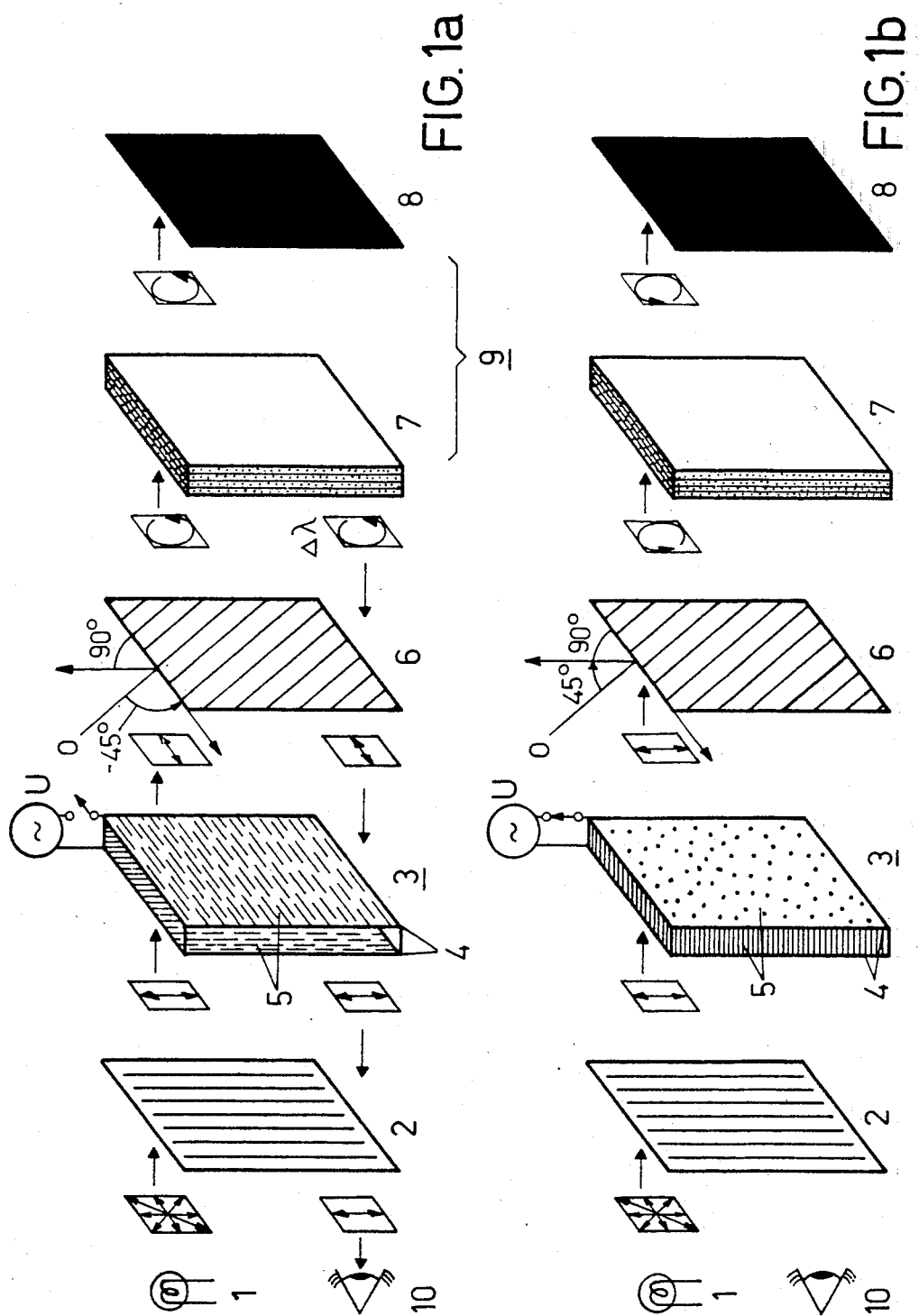

DEVICE FOR THE PRODUCTION AND MODULATION OF MONOCHROMATIC LIGHT

BACKGROUND OF THE INVENTION

1. Field of the Invention:

The present invention concerns a device for the production and modulation of colored light by means of an electrode-coated liquid-crystal cell combined with a polarizing arrangement and a reflector, the liquid crystal having a helical twisted structure in the direction perpendicular to the electrodes.

2. Description of the Prior Art:

Devices of the type mentioned above are already known from German Pat. No. 2,158,563. Essentially they consist of a liquid crystal situated between two transparent electrodes, the molecules of the liquid crystal lying parallel to one another at the electrode surfaces and assuming upon 90° rotation of one electrode with respect to the other a helical twisted molecular structure along the normal to the electrode surfaces, and a polarizing arrangement composed of two crossed, linear polarizers located in front of and behind the liquid crystal, together with a reflector on the back of the rear polarizer. With the polarizers parallel to one another and the polarizing direction of the front one parallel or perpendicular to the preferred direction of the liquid-crystal molecules adhering to the front electrode, incident white light is rotated through 90° by the optical rotatory power of the twisted liquid-crystal layer and is therefore absorbed by the rear polarizer. Upon application of a suitable voltage to the electrodes, the liquid crystal loses its optical rotatory power. The incident polarized light leaves the cell with unchanged polarization direction and, after reflection and re-transmission through the cell and the polarizing arrangement, reaches the observer.

A disadvantage of such devices is that the brightness of the reflected light often is not sufficient since the light must pass through polarizing sheets four times and is greatly weakened by absorption in the process. As is known, polarizers not only weaken the intensity of incident unpolarized light by absorption of the perpendicular component of the field vector, but also absorb a significant portion of the light having a parallel field vector since polarizing films are not optically ideal, so that such devices exhibit only relatively low-intensity display surfaces.

SUMMARY OF THE INVENTION

It is accordingly one object of the invention, therefore, to devise an apparatus for the production and modulation of colored light, distinguished by a bright and contrast-rich display surface.

This and other objects are attained in accordance with the invention by providing as the polarizing device a linear polarizer located between the light source and the liquid-crystal cell and as reflector, a substance with a helical structure, and by placing a circular polarizer between the liquid-crystal cell and the reflector.

It is recommended that a liquid-crystal with a 90° twist structure be used and that a quarter-wave plate be used as the circular polarizer. Here the preferred direction of the electrode surfaces next to the quarter-wave plate and the optic axis of the quarter-wave plate are rotated 45° with respect to one another about the perpendicular to the quarter-wave plate.

As the substance with a helical structure, liquid crystals are particularly suitable, e.g. cholesteric or mixtures of cholesteric and nematic such as mixtures of cholesteryl oleyl carbonate (COC) and n-(p-methoxybenzylidine)-p-n-butyl-aniline (MBBA). F. Kahn has presented the optical properties of such systems in APPl. Phys. Lett. 18, 231 (1971) and has established that the reflected light exhibits a relatively narrow bandwidth and, depending on the mixing ratio of the liquid crystal, possesss a variable coloration. Because of its spiral structure, a cholesteric liquid crystal can distinguish between left and right circularly polarized light and thus not only makes it possible to produce colored light from white light, but also gives, in particular, a circular polarization [cf. e.g. J. L. Fergason, Mol. Cryst. and Liq. Cryst. 1, 239 (1966)].

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1a illustrates the structure and light path of the device of the invention in the bright setting; and, FIG. 1b illustrates the structure and light path of the device of the invention in the dark setting.

BRIEF DESCRIPTION OF THE PREFERRED EMBODIMENTS

Referring now to the drawings, wherein like reference numerals designate identical or corresponding parts throughout the several views, and more particularly to FIGS. 1a and 1b thereof, a light source is denoted by 1. The number 2 denotes a linear polarizer and 3 a liquid-crystal cell, represented only schematically in the figures and indicated by two transparent electrodes 4, with their preferred directions rotated 90° with respect to one another, as well as by some molecules 5 of the liquid crystal. A control voltage is applied to the electrodes 4 to establish an electric field for orientation of the liquid-crystal molecules. Reference number 6 indicates a quarter-wave plate, the optic axis 0 of which is rotated ±45° from the preferred direction of the adjacent electrode 4 about the normal to the quarter-wave plate. The number 7 denotes the thin layer of a cholesteric liquid crystal and 8 is an absorption layer of a black substrate. The liquid crystal and absorption layer together form the reflector 9. The reflected light reaches observer 10.

The white unpolarized light of the source 1 passes through the polarizer 2 and arrives at the liquid-crystal cell 3 polarized vertically. If, as in FIG. 1a, there is no control voltage U applied to the electrode surfaces 4, then the polarized light is rotated through 90° by the liquid-crystal molecules 5 and, upon leaving the cell 3, arrives at the quarter-wave plate 6 horizontally polarized. The quarter-wave plate changes the linearly polarized light to right-circularly polarized light (represented in the figures by an open circle with an arrow head). This circularly polarized white light is totally reflected without phase change in a spectral range $\Delta\lambda$ by the cholesteric liquid-crystal layer 7 of the reflector 9, while the rest of the light, i.e. all the light outside the wavelength range $\Delta\lambda$, is almost completely transmitted by the cholesteric liquid-crystal layer 7 and is absorbed by the black substrate 8. The colored, totally-reflected light is again transformed into horizontally, linearly-polarized light by the quarter-wave plate 6, is rotated into the vertical again by the 90°-twist of the nematic liquid-crystal molecules 5 of the cell 3 and reaches the observer as iridescent light without significant absorption loss through the polarizer 2.

If a control voltage U is now applied to the electrodes 4, e.g. about 3V. in the case of tin oxide coated electrodes 4 separated by a liquid crystal layer about 8 $\mu$ thick and sufficing to turn the liquid-crystal molecules 5 in the field direction, then the liquid-crystal cell 3 does not change the orientation of the vertical polarization plane of the transmitted light which is incident on the quarter-wave plate 6 polarized at ±45° to its optic axis 0. This angle is equal and opposite to that in the case of no voltage across the cell 3 so that now left-circularly polarized light is incident on the liquid-crystal layer 7, which is completely transparent to it, and it is subsequently absorbed by the black substrate 8 of the reflector 9.

In a display, in which there is, together with a voltage-free region of the liquid crystal 5, also a region aligned by an electric field, the observer sees, for example, black figures against an iridescent background.

The complementary electro-optic effect can then also be produced in modifying the invention, if either the quarter-wave plate 6 or the polarizer 2 is rotated 90°, i.e. the voltage-free region appears dark and the aligned region iridescent.

As the liquid-crystal substance 7 of reflector 3 were used mixtures of n-(p-methoxybenzylidine)-p-n-butylaniline (MBBA), a nematic liquid crystal at room temperature, and the cholesteric cholesteryl oleyl carbonate (COC). Outstanding results were obtained, for example, with the mixtures listed below used with a doubly-refracting polyvinylalcohol (PVA) film with a retardation of 140 ± 20 m$\mu$, at 560 m$\mu$, as well as a reflector 9 consisting of two glass plates, between which the approximately 5 $\mu$ thick layer 7 of the reflecting liquid crystal is located and the rear side of which is coated with a layer 8 of black paint:

| I | 48.0 % | COC in MBBA |
| II | 53.1 % | COC in MBBA |
| III | 58.4 % | COC in MBBA |

Thus, at room temperature mixture I gave an iridescent orange reflected color, while mixtures II and III evoked a green and blue-green coloration, respectively.

To minimize undesirable effects due to parallax, the separation of the liquid-crystal cell 3 and layer 7 is decreased in an especially preferred embodiment of the invention. This can be done by cementing to the reflector side of cell 3 a quarter-wave plate 6 from a stretched, approximately 40$\mu$ thick polyvinylalcohol film, which is then placed in direct contact with layer 7. The few $\mu$ thick layer 7 can be sealed in from the other side with a glass plate or another polymer film with an absorbing black coating 8 on the rear side. Instead of cementing the quarter-wave plate to the back of cell 3, one can also be put directly behind the electrode 4 or the cell 3 on the reflector side, possibly by evaporation of a suitable double-refracting material. In place of a PVA film the quarter-wave plate can also be of quartz, sapphire, apophyllite or any other suitable material. The layer 7 can be a film containing tiny, encapsulated drops of liquid crystal.

Further, it is also possible to replace the liquid-crystal layer 7 with a solid one. Since it is necessary only that this layer have a helical molecular structure, it can consist of a solid, polymerized mesophase or a glass-like solid obtained by supercooling a mesophase.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. In a device for the production and modulation of colored light from light emanating from a suitable source by means of a liquid-crystal electro-optical cell coated with electrodes and combined with a polarizing arrangement and a reflector, the liquid crystal exhibiting a helically twisted structure with a twisting angle of at least approximately 90° along the direction normal to the film-like electrodes, the improvement comprising:

a linear polarizer positioned between said light source and said liquid-crystal cell and acting as said polarizing arrangement, said reflector formed of a substance with a helicoidal structure which reflects colored circularly polarized light of one handedness and transmits colored circularly polarized light of the opposite handedness and a light absorbing material directly adjacent said substance; and, a circular polarizer formed of a quarter-wave plate positioned between said liquid-crystal cell and said reflector.

said quarter-wave plate directly adjacent to said liquid-crystal cell on the side facing said reflector and, said substance with a helicoidal structure placed directly adjacent to said quarter-wave plate to minimize undesirable effects due to parallax.

2. An improved device as in claim 15, wherein: the preferred direction of said coated electrode which is positioned adjacent to said quarter-wave plate and the optic axis of the latter are rotated 45° from one another about the normal to said quarter-wave plate.

3. An improved device as in claim 1, wherein: said reflector with a helicoidal structure is a liquid-crystal.

4. An improved device as in claim 3, wherein: said reflector liquid crystal is cholesteric.

5. An improved device as in claim 4, wherein: said reflector liquid crystal is cholesteryl olyl carbonate.

6. An improved device as in claim 4, wherein: said reflector liquid-crystal is a mixture of cholesteric substances.

7. An improved device as in claim 4, wherein: said reflector liquid crystal comprises a mixture of nematic and cholesteric substances.

8. An improved device as in claim 7, wherein: said reflector liquid crystal has approximately the composition 48% by weight cholesteryl olyl carbonate and 52% by weight n-(p-methoxybenzylidine)-p-n-butylanilin.

9. An improved device in claim 7, wherein: said reflector liquid crystal has approximately the composition 53% by weight cholesteryl olyl carbonate and 47% by weight n-(p-methoxybenzylidine)-p-n-butylanilin.

10. An improved device as in claim 7, wherein:
said reflector liquid crystal has approximately the composition 58% by weight cholesteryl olyl carbonate and 42% by weight n-(p-methoxybenzylidine)-p-n-butylanilin.

11. An improved device as in claim 3, wherein:
said reflector liquid crystal is in the form of small, encapsulated droplets.

12. An improved device as in claim 3, wherein:
said reflector liquid crystal is imbedded between two polymer films.

* * * * *